(12) United States Patent
Vishwanath et al.

(10) Patent No.: US 10,728,030 B2
(45) Date of Patent: Jul. 28, 2020

(54) SYSTEM AND METHOD FOR KEY MANAGEMENT IN COMPUTING CLUSTERS

(71) Applicant: DELL PRODUCTS, LP, Round Rock, TX (US)

(72) Inventors: Manjunath Vishwanath, Bangalore (IN); Chandrashekar Nelogal, Round Rock, TX (US); Chitrak Gupta, Bangalore (IN); Pavan Kumar G, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 176 days.

(21) Appl. No.: 15/983,021

(22) Filed: May 17, 2018

(65) Prior Publication Data
US 2019/0356486 A1  Nov. 21, 2019

(51) Int. Cl.
*H04L 9/08* (2006.01)

(52) U.S. Cl.
CPC .................................. *H04L 9/0894* (2013.01)

(58) Field of Classification Search
CPC ... H04L 9/0894; H04L 9/0866; H04L 9/3236; H04L 63/04; H04L 63/10
See application file for complete search history.

(56) References Cited

U.S. PATENT DOCUMENTS

| 7,404,088 | B2 | 7/2008 | Giobbi | |
|---|---|---|---|---|
| 9,959,127 | B2 * | 5/2018 | Seibert | G06F 21/31 |
| 10,311,224 | B1 * | 6/2019 | Farhan | H04L 9/0897 |
| 10,459,664 | B1 * | 10/2019 | Dreier | G06F 11/1441 |
| 2011/0295908 | A1 * | 12/2011 | To | G06F 21/31 |
| | | | | 707/803 |
| 2017/0344294 | A1 | 11/2017 | Mishra et al. | |

* cited by examiner

*Primary Examiner* — Paul E Callahan
(74) *Attorney, Agent, or Firm* — Larson Newman, LLP (57) ABSTRACT

Cryptographic affinities are generated to improve security in server environments. One or more cryptographic affinities protect electronic data stored within a blade server. The cryptographic affinities are generated based on hashing a unique blade identifier and a unique identifier assigned to a network interface. The cryptographic affinities thus govern read, write, and other access operations. If any cryptographic affinity fails to match historical observance, then access to the blade server may be denied.

20 Claims, 9 Drawing Sheets

SYSTEM AND METHOD FOR KEY MANAGEMENT IN COMPUTING CLUSTERS

FIELD OF THE DISCLOSURE

The present disclosure generally relates to information handling systems, and more particularly relates to cryptographic key management of physical nodes in compute clusters.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Cryptographic signatures may be based on individual blade servers and networking interfaces. That is, a cryptographic affinity may be generated based on an individual blade server and its network interface. Individual blade servers, in other words, may be cryptographically bound to a particular network interface. When storage capacity is shared among multiple servers, exemplary embodiments permit cryptographic key management in shared computing clusters and environments.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
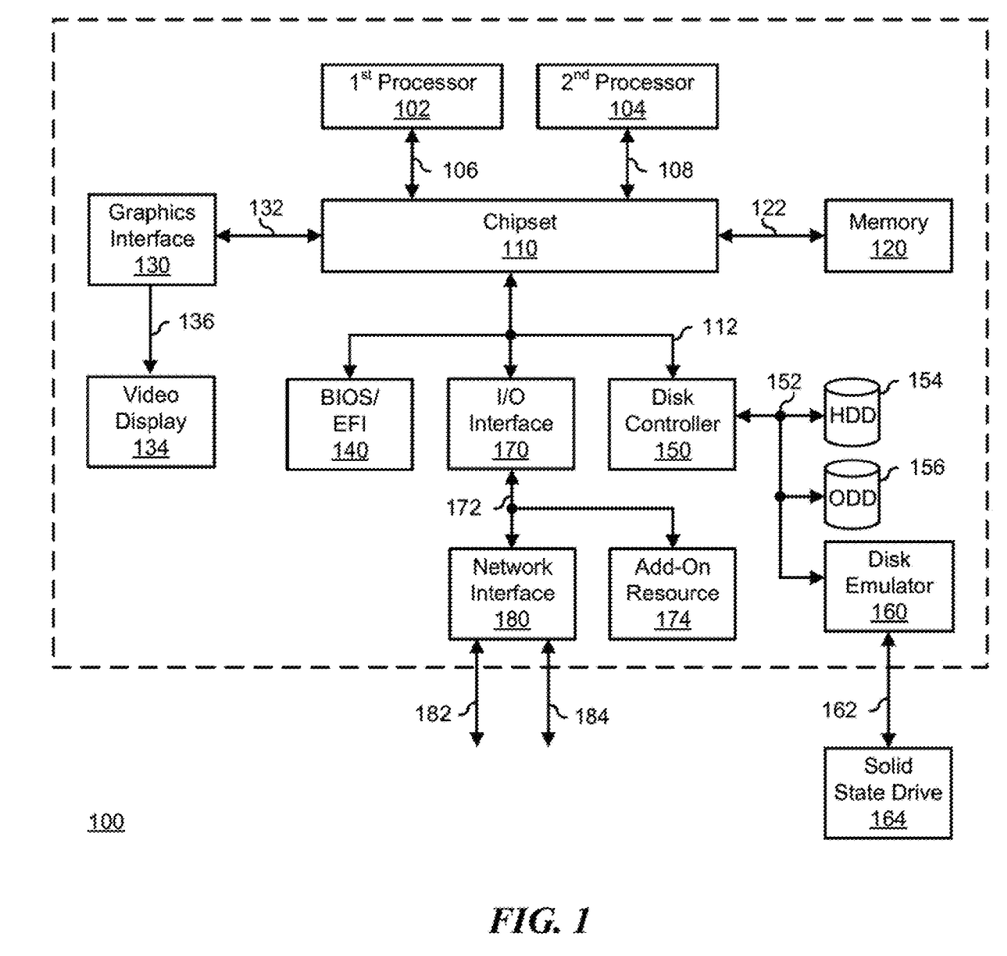
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
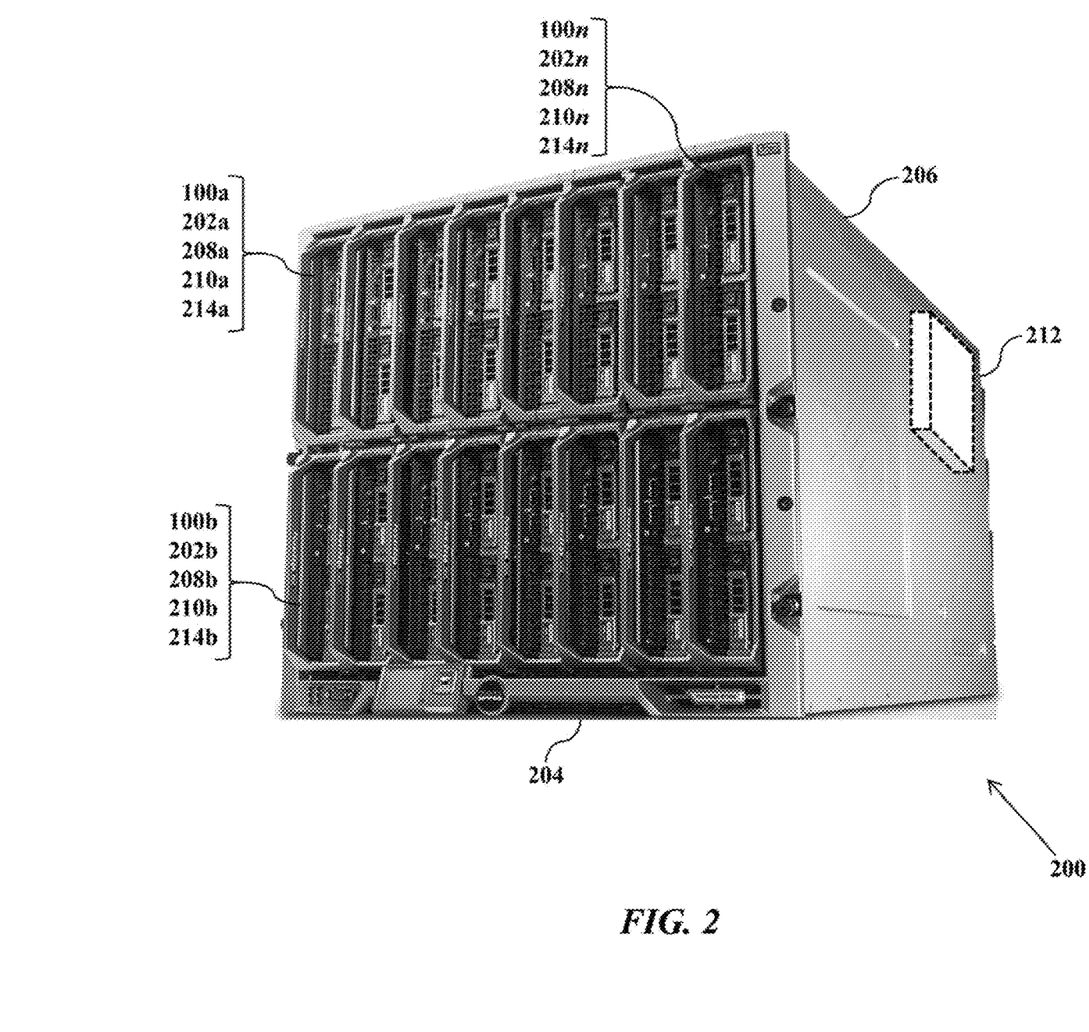
FIG. 2 illustrates a computing cluster, according to exemplary embodiments.

Data security is very important in today's environment. Nearly every day one reads of yet another hacking. Data is even being held ransom. Exemplary embodiments thus add elegant levels of additional security to servers storing data. FIG. 2 illustrates a computing cluster 200, according to exemplary embodiments. The computing cluster 200 has several of the information handling systems (illustrated as reference numerals 100*a-n*) that operate as computing nodes 202*a-n*. Clustering is known technique that provides high availability and redundancy in the case of nodal failure. As the reader may recognize, FIG. 2 illustrates blade server ecosystem 204. A common chassis 206 has slots that house or contain multiple computing blades (illustrated as reference numerals 208*a-n*). Each blade 208, in other words, may be an individual one of the information handling systems 100 that operate as the computing node 202 in the computing cluster 200. While there may many be any number of the blades 208, FIG. 2 illustrates a modular enclosure that can accommodate sixteen (16) individual blades 208. Some of the blades 208 may function as computing servers, while other blades 208 may function as storage facilities or components. Any of the blades 208 may even perform both server and shared storage functions. Regardless, each individual computing blade 208 may have its own corresponding baseboard management controller 210*a-n* (such as a hardware processor and a memory device, not shown for simplicity).

The blade server ecosystem 204 may also have a chassis management controller 212. Because the blade server ecosystem 204 may have many individual or separate blades 208*a-n*, the chassis management controller 212 manages the individual blades 208 operating within the chassis 206. Each blade 208*a-n* communicates with the chassis management controller 212 via a corresponding host bus adapter 214*a-n*. As the reader may realize, each computing blade 208 may be accessed via the host bus adapter 214 to an input/output network architecture, such as ISA, SCSI, $I^2C$, SPI, and/or USB. The blade server ecosystem 204, its internal hardware and software components, and the input/output architecture are generally well known, so the known details need not be explained in detail.

Figure 3:
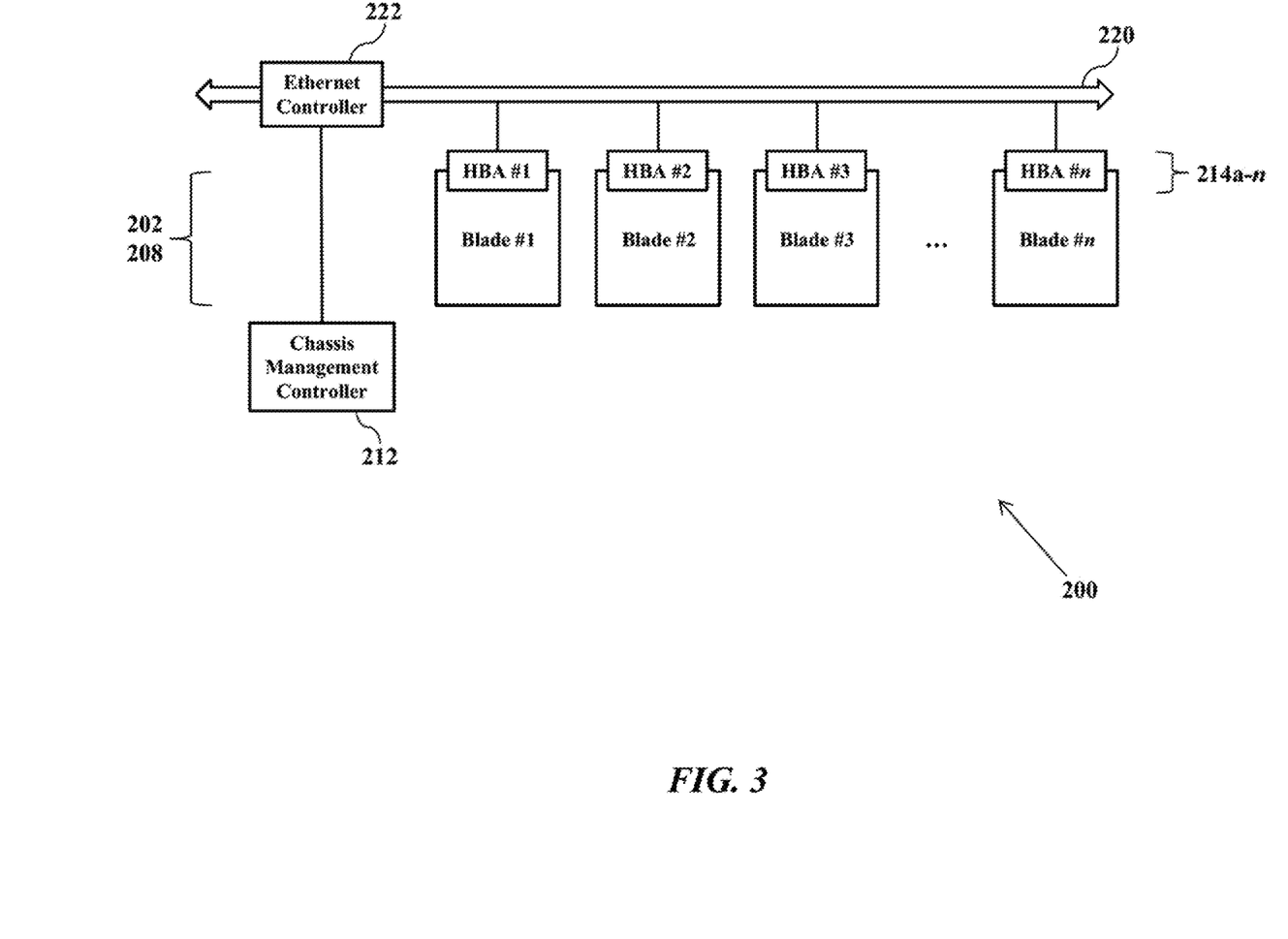
FIG. 3 thus illustrates nodal networking, according to exemplary embodiments.

FIG. 3 thus illustrates nodal networking, according to exemplary embodiments. As the reader may understand, any of the nodes 202 and/or blades 208 may have their computing resources (hardware processor and memory device, not shown for simplicity) available for shared use. Each blade 208 may thus be accessed via a network bus 220. While exemplary embodiments may use any networking technology, most readers are thought to be familiar with Ethernet networking. The network bus 220, in other words, may operate according to the Ethernet technological standard. Each blade 208*a-n* may thus have its own corresponding host bus adapter (HBA) 214*a-n* to the Ethernet bus 220. Each host bus adapter 214*a-n* and the chassis management controller 212 may even interface with an Ethernet controller 222 that manages Ethernet communications via the Ethernet bus 220. The chassis management controller 212 may thus offload packet inspection and control of Ethernet communications to the Ethernet controller 222.

Figure 4:
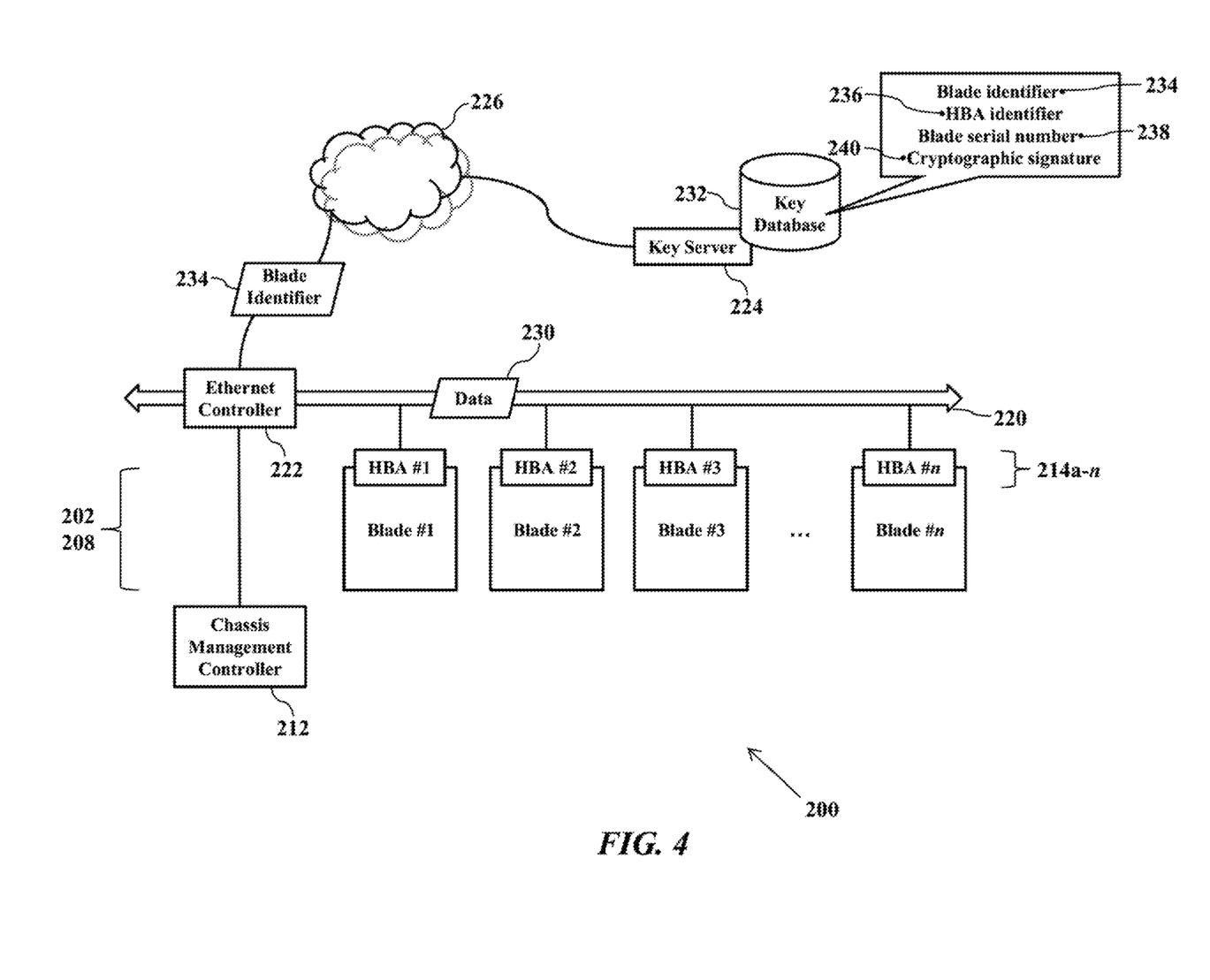
FIGS. 4-5 illustrate HBA-based cryptographic security, according to exemplary embodiments.
Figure 5:
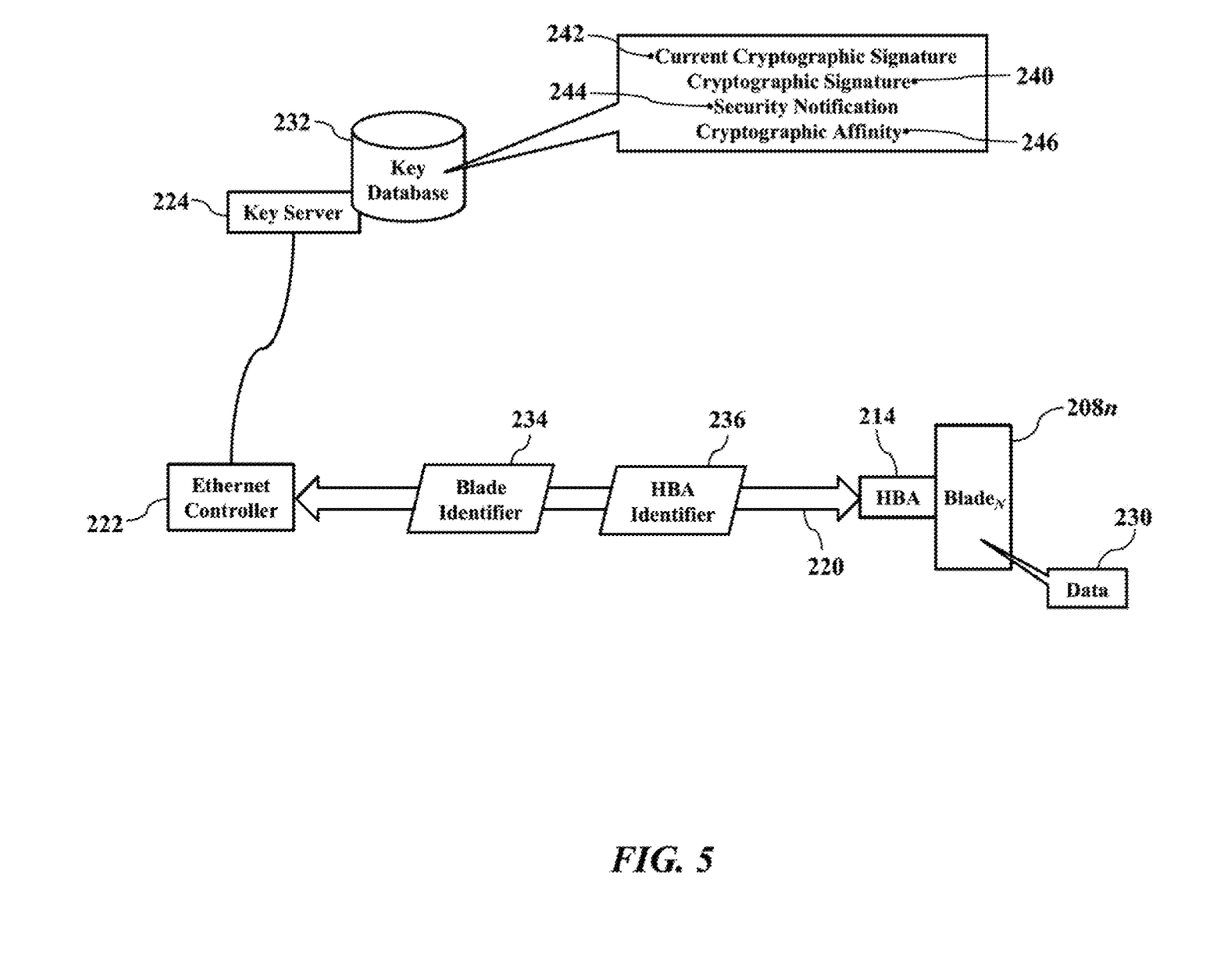

FIGS. 4-5 illustrate HBA-based cryptographic security, according to exemplary embodiments. When any data 230 is requested from, sent to, or receive from, any node 202 or blade 208 via the Ethernet bus 220, the Ethernet controller 222 may interface with a key server 224. The Ethernet controller 222 and the key server 224 communicate via a communications network 226 (such as the Internet). The key server 224 stores an electronic key database 232. The key database 232 has entries that map, relate, or associate each read/write operation to a blade identifier 234 and to a host bus adapter (HBA) identifier 236. The Ethernet controller 222 sends the blade identifier 234 via the communications network 226 to the key server 224. While the blade identifier 234 may be any alphanumeric combination that uniquely identifies the corresponding blade 208, FIG. 4 illustrates a blade serial number 238 assigned to the corresponding blade 208. Similarly, the host bus adapter identifier 236 is any alphanumeric combination that uniquely identifies the corresponding host bus adapter (HBA) 214. The key server 224 and/or the Ethernet controller 222 may hash the blade identifier 234 and the host bus adapter identifier 236 to generate a cryptographic signature 240. The key server 224 may then store the cryptographic signature 240 in the key database 232 to authorize, or to deny, access to the electronic data stored by the blade 208.

FIG. 5 illustrates data access. Whenever exemplary embodiments read from, write to, receive a request, or otherwise access any blade 208, exemplary embodiments may verify the cryptographic signature 240. That is, the Ethernet controller 222 may send the blade identifier 234 to the remote key server 224. The key server 224 may then recalculate and/or compare the cryptographic signature 240 to current hash values to ensure the same host bus adapter 214 is authorized to access the same blade 208. That is, at any time, the Ethernet controller 222 may query the blade 208 for its blade identifier 234. The Ethernet controller 222 may also query the host bus adapter 214 for its host bus adapter identifier 236. The Ethernet controller 222 may then send the blade identifier 234 and/or the host bus adapter identifier 236 to the key server 224. The key server 224 has a processor and memory device (not shown for simplicity) that may generate a current cryptographic signature 242 by hashing the blade identifier 234 and the host bus adapter identifier 236. The key server 224 may then compare the current cryptographic signature 242 with the cryptographic signature 240 that was historically or previously generated from a past transaction or entry (perhaps as stored/logged in the key database 232). If a match is determined between the current cryptographic signature 242 and some historical, previous, or past cryptographic signature 240, then a logical rule, statement, or expression permits the key server 224 to infer that the same host bus adapter 214 is accessing, servicing, or operating with the same blade 208. The Ethernet controller 222 may thus be permitted to authorize any read/write access to any internally stored electronic data 206. However, if the current cryptographic signature 220 fails to match the cryptographic signature 240 previously generated, then exemplary embodiments may infer that either the blade 208 or the host bus adapter 214 is unauthorized for access. Exemplary embodiments may thus deny read/write access to the electronic data 206 and even generate a security notification 244 (such as an SMS text message, email, or other warning).

Exemplary embodiments thus present an elegant security solution. As this disclosure above explained, some of the blades 208 may function as a shared storage drive to many computing nodes 202. Conventional cryptographic schemes are based on the baseboard management controller 210 and/or the chassis management controller 212 (both illustrated in FIG. 2), which can lock out shared drives with multiple keys in random order, depending on which host bus adapter 214 first sees or communicates with the shared drive. Here, though, cryptographic security is based on the individual blade 208 and its host bus adapter 214, thus allowing individual storage drives to be secured without locking out the entire chassis hosting multiple computing blades.

Exemplary embodiments generate a cryptographic affinity 246. Once any blade 208 is initially cryptographically keyed to the host bus adapter 214, the cryptographic signature 240 may be a master key for all future use. Exemplary embodiments thus generate the cryptographic affinity 246 between the blade 208 and the host bus adapter 214. If the same blade 208 and the same host bus adapter 214 are historically observed, the privacy and security of any electronic data 230 is ensured. However, if the blade 208 and/or the host bus adapter 214 differ from historical usage (perhaps as identified by the electronic key database 232), the blade 208 and/or the host bus adapter 214 may be locked out and denied access or usage (for example the blade 208 and/or the host bus adapter 214 is strange or unknown). The Ethernet controller 222 may thus refuse to read, write, or otherwise provide access.

Exemplary embodiments protect the electronic data 230. Exemplary embodiments generate the cryptographic affinity 246 based on the individual blade 208 and the host bus adapter 214. At any time, exemplary embodiments may calculate the cryptographic affinity 246 and compare to an initial, pre-approved, or master value(s). If the cryptographic affinity 246 matches, then the blade 208 is approved for use (such as computing and/or storage). However, if the cryptographic affinity 246 fails to match an expected value, then exemplary embodiments may infer that the blade 208 has been improperly or illegally installed in an unapproved location. Exemplary embodiments may lock out the blade 208, thus preventing read, write, or other access operations. Similarly, if the cryptographic affinity 246 fails to match an expected value, then exemplary embodiments may infer that the host bus adapter 214 is unauthorized, perhaps again denying read, write, or other access operations.

Nodal access may also be maintained. Even though the cryptographic affinity 246 may fail to match an expected value, the computing cluster 200 may still access the key server 224. Recall that the key server 224 may store the cryptographic signature 240 as a master key. So, even if the blade 208 and/or the host bus adapter 214 should fail, any other nodal member of the computing cluster 200 may access the key server 224 and retrieve the cryptographic signature 240. That is, in the event of any failure within the computing cluster 200, any computing node 202 within the computing cluster 200 may be authorized to query the key server 224 to retrieve the cryptographic signature 240 as the master key. The computing cluster 200 thus maintains its ability to read/write/access data, even though a particular blade 208 or host bus adapter 214 should fail. The key server 224 may thus provide any cryptographic keys to ensure the computing cluster 200 always has data access.

Figure 6:
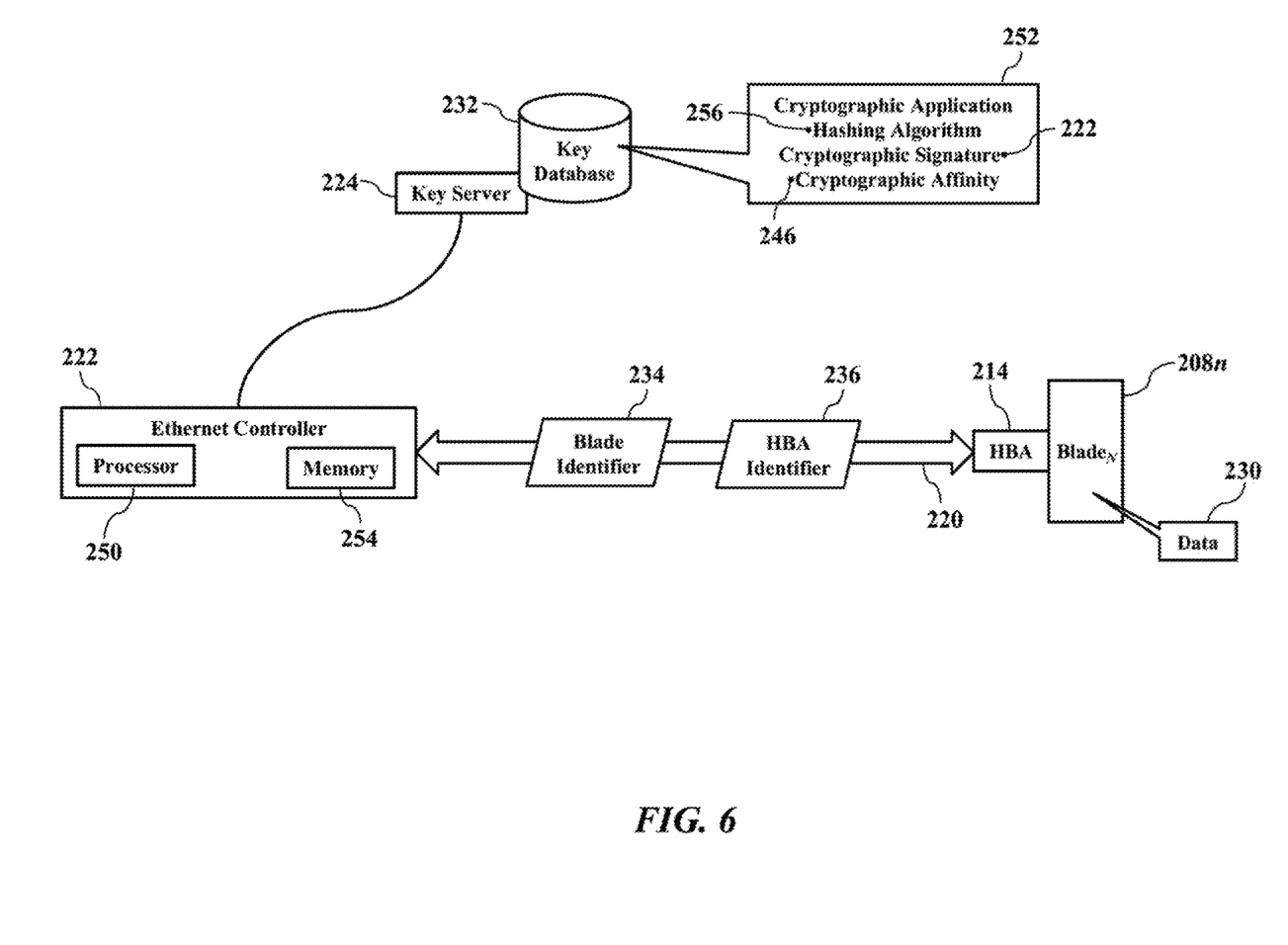
FIG. 6 is a detailed illustration of key management, according to exemplary embodiments.

FIG. 6 is a more detailed illustration of key management, according to exemplary embodiments. Here the Ethernet controller 222 again interfaces with any blade 208 via the Ethernet bus 220. The key server 224 has a processor and memory device (not shown for simplicity) that executes a cryptographic application 252. The cryptographic application 252 instructs the key server 224 to generate the cryptographic affinity 246. The cryptographic application 252, for example, causes the key server 224 to retrieve or receive the blade identifier 234 and the host bus adapter identifier 236 and apply an electronic representation of a hashing algorithm 256. The hashing algorithm 256 thus generates a unique hash value representing the blade identifier 234 and the host bus adapter identifier 236. Exemplary embodiments, in other words, bind the data 230 to the particular blade 208 and to the particular host bus adapter 214. Exemplary embodiments may thus securely lock the data 230 via the physical blade 208 and/or the host bus adapter 214. If the blade 208 changes, and/or the host bus adapter 214 changes, then their replacement components may be unable to generate the same, historical cryptographic key 240. A rekeying procedure may thus be required, and the stored electronic data 230 may be erased.

Exemplary embodiments may monitor peripheral devices. The cryptographic application 252 may periodically or randomly generate the cryptographic affinity 246. The cryptographic application 252 may have a calendar or timing component that requeries the blade 208 for its blade identifier 234 and requeries the host bus adapter 214 for its host bus adapter identifier 236. The cryptographic application 252 may then reapply the hashing algorithm 256 to recalculate the current cryptographic key 242. If the cryptographic application 252 determines a difference in hash values, then the peripheral components have changed and read/write access may be denied. Exemplary embodiments may recreate the cryptographic application 252 according to date, time interval, or random occurrence for added cryptographic security.

Exemplary embodiments may be applied by the Ethernet controller 222. For example, the Ethernet controller 222 has its own dedicated processor 250 that may execute the cryptographic application 252 stored in a solid-state, non-volatile memory device 254. The memory device 254 may also be dedicated to the Ethernet controller 222, or the memory device 254 may be system memory (such as the memory 120 explained with reference to FIG. 1). The cryptographic application 252 instructs the processor 250 to generate the cryptographic affinity 246 based on the blade identifier 234 and the host bus adapter identifier 236 (by applying the hashing algorithm 256), as above explained.

Figure 7:
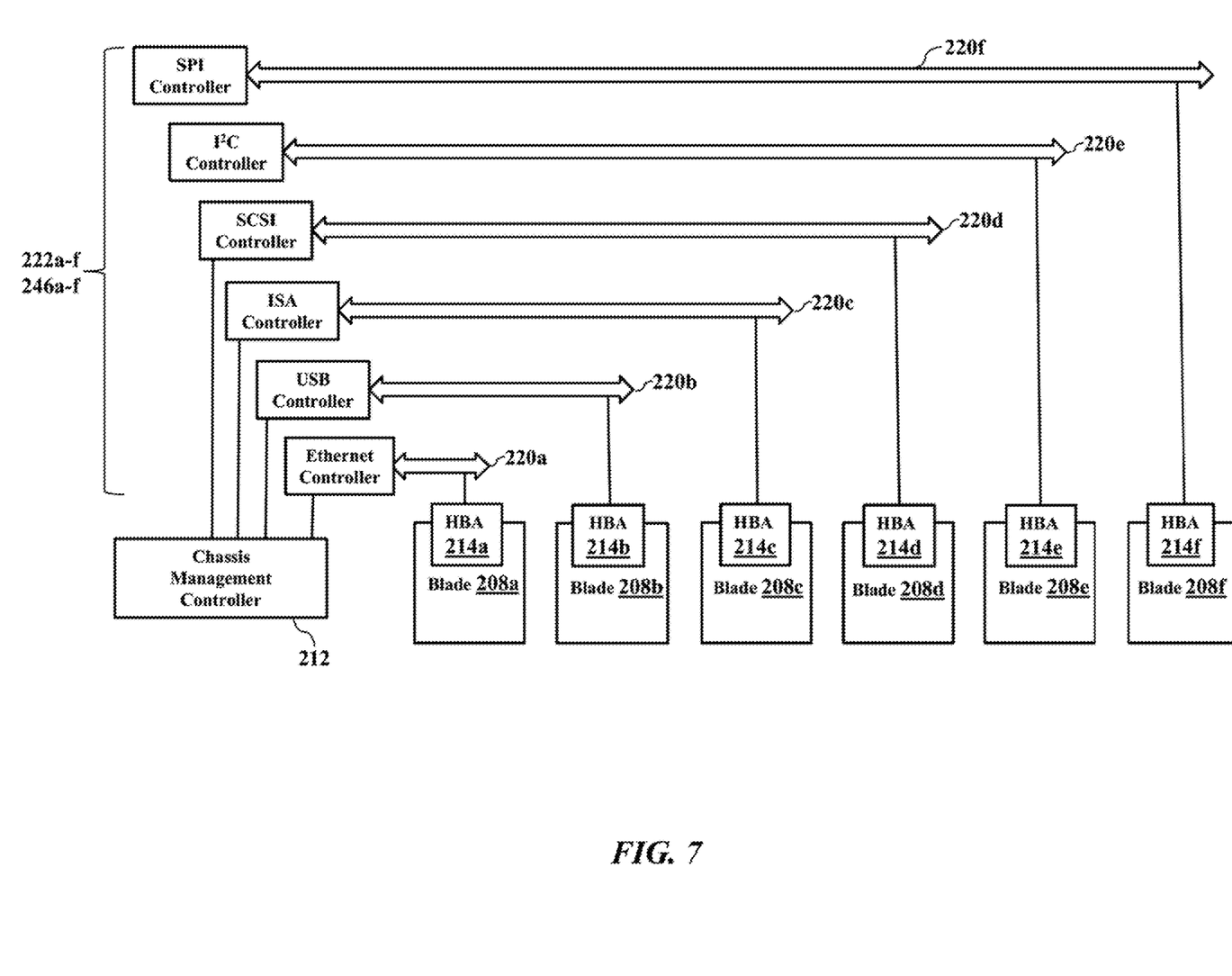
FIG. 7 further illustrates HBA-based cryptographic security, according to exemplary embodiments.

FIG. 7 further illustrates HBA-based cryptographic security, according to exemplary embodiments. Here exemplary embodiments may be applied to any networking technology. This disclosure previously explained how the blade server ecosystem 204 may employ several different input/output network architectures. The blade 208a, for example, may communicate with the chassis management controller 212 via the host bus adapter 214a to the Ethernet bus 222a. Other blades 208, though, may communicate via other input/output network architectures. The blade 208b, for example, may communicate with the chassis management controller 212 via the host bus adapter 214b to a uniform serial bus 222b. As the reader may understand, the uniform serial bus 222b utilizes the USB networking and communications standard. Blades 208c-f may communicate with the chassis management controller 212 via the host bus adapters 214c-f to respective buses 220c-f that utilize the known ISA, SCSI, I²C, and SPI networking and communications standards. Even though these input/output architectures are generally well known, their individual cryptographic affinities 246a-f are unique and bind any data to physical components.

Figure 8:
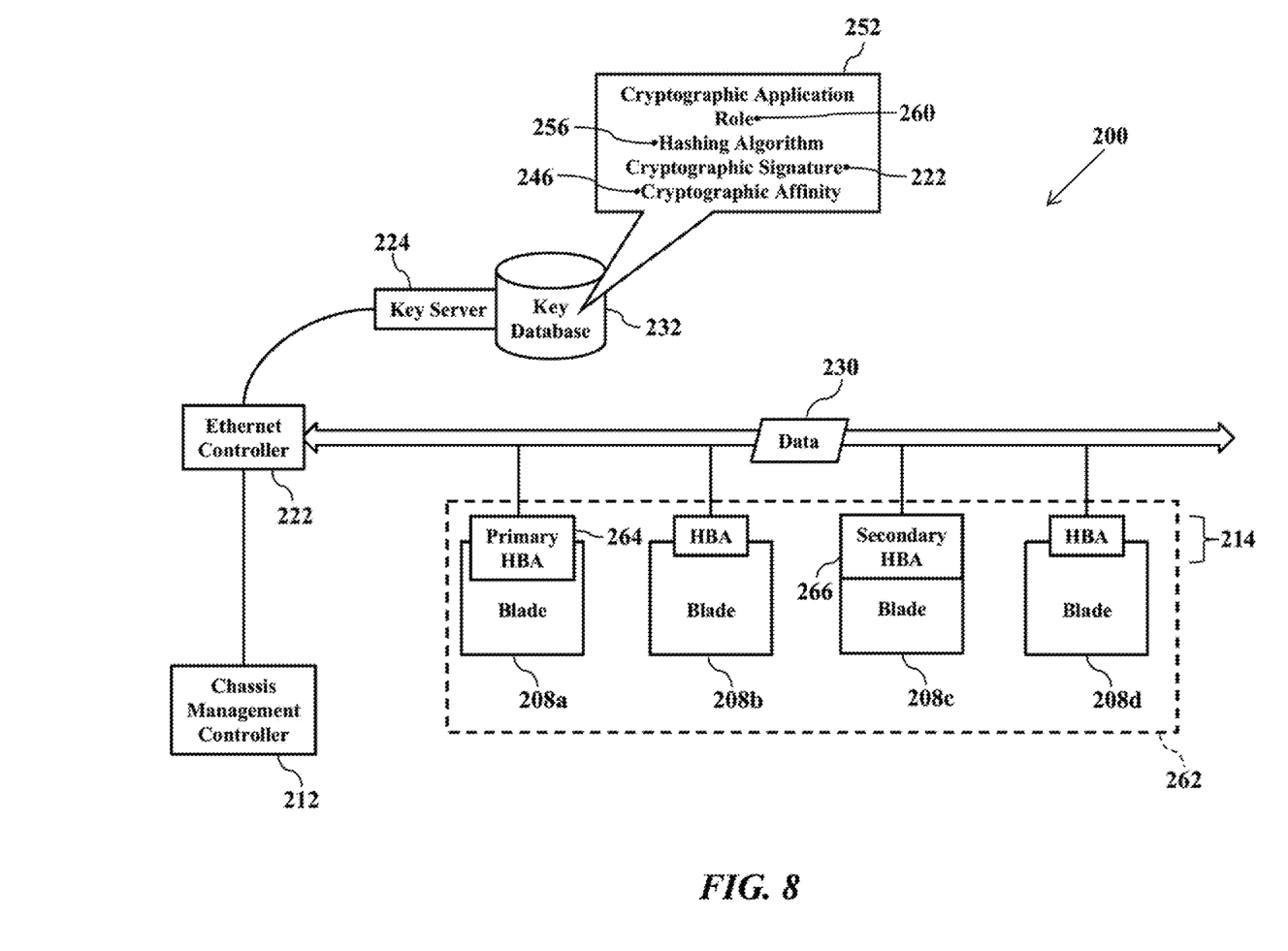
FIG. 8 illustrates role play, according to exemplary embodiments.

FIG. 8 illustrates role play, according to exemplary embodiments. Here exemplary embodiments may assign a role 260 to any of the host bus adapters 214. As the reader may again understand, the blades 208 may be logically grouped together as a group 262. The chassis management controller 212, the Ethernet controller 222, and/or the key server 224 may then manage the group 262. The cryptographic application 252, for example, may assign one of the host bus adapters 214 the role 260 of a primary 264. The cryptographic application 252 may then generate, store, and/or maintain an association between the primary host bus adapter 264 and the other members of the group 262. When the cryptographic application 252 then computes the cryptographic signature 222 (such as the cryptographic affinity 246) for any blade 208, the cryptographic application 252 may query for and/or retrieve the host bus adapter identifier 236 assigned to the primary 264. Any of the data 230 may thus be keyed or bound to the primary host bus adapter 264 representing the group 270 of the blades 208.

Other roles may also be assigned. As the reader may envision, components sometimes fail or become unavailable for many reasons. Here, then, the cryptographic application 252 may additionally assign another one of the host bus adapters 214 in the group 262 as a secondary 266. Exemplary embodiments may compute the cryptographic signature 222 for any blade 208 based on the host bus adapter identifier 236 assigned to the primary 264 and/or the secondary 266. Any of the data 230 may thus be keyed or bound to the primary host bus adapter 264 and/or the secondary host bus adapter 266 representing the group 270 of the blades 208.

Exemplary embodiments may thus collect and store nodal parameters. Once the primary 264 and secondary 266 roles are assigned, the corresponding host bus adapters 214 may be configured for the management of the cryptographic keys. Exemplary embodiments, for example, may map slots to the computing nodes 202, assign the primary 264 and secondary 266 roles, and store their respective blade associations. The host bus adapter 214 assigned the primary role 264 may retrieve a new KeyID/Passphrase and secure the newly assigned drives using the same. Any secondary HBAs may refrain from securing the shared drives. As periodic monitoring occurs, if the HBA/node 202 assigned to the primary 264 should fail or otherwise become unresponsive, exemplary embodiments may designate another one of the host bus adapters 214 as the primary 264 and provide it the KeyID for securing any new assignments to the cluster.

Figure 9:
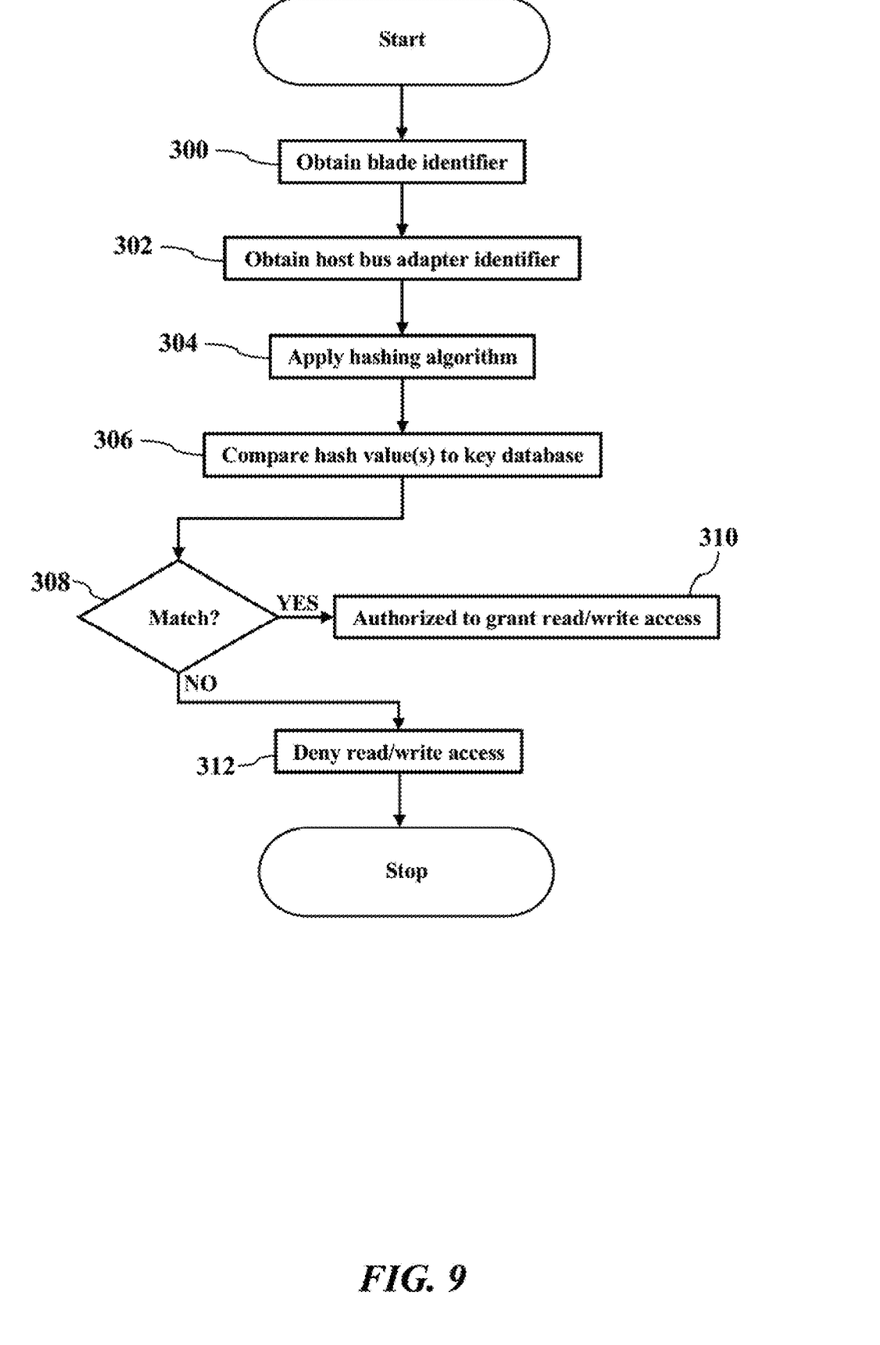
FIG. 9 illustrates a method or process for key management, according to exemplary embodiments.

FIG. 9 illustrates a method or process for key management, according to exemplary embodiments. The blade identifier 234 (Block 300) and the host bus adapter identifier 236 (Block 302) are obtained. The blade identifier 234 and the host bus adapter identifier 236 are hashed (Block 304) to yield the cryptographic signature 222 (Block 306). The cryptographic signature 222 is compared to historical entries in the key database 232 (Block 308). If a matching entry is determined (Block 310), then read/write access may be authorized (Block 312). However, if the key database 232 fails to contain a matching entry (Block 308), then read/write access may be denied (Block 314).

Exemplary embodiments may packetize. The information handling system 100 and the baseboard management controller 240 may interface with a local area network and/or a wide area network (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term computer-readable medium includes a single medium or multiple media, such as a centralized or distributed database, and/or associated caches and servers that store one or more sets of instructions. The term computer-readable medium shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a device, a module, or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of cryptographic security, comprising:
   receiving, by an Ethernet controller, a read/write operation associated with a blade server installed in a chassis;
   receiving, by the Ethernet controller, a blade identifier associated with the blade server installed in the chassis;
   receiving, by the Ethernet controller, a host bus adapter identifier associated with a host bus adapter that communicates with the blade server installed in the chassis;
   generating, by the Ethernet controller, a cryptographic affinity by hashing the blade identifier and the host bus adapter identifier using an electronic representation of a hashing algorithm;
   comparing the cryptographic affinity to a historical value; and
   in response to the cryptographic affinity failing to match the historical value, denying the read/write operation associated with the blade server.

2. The method of claim 1, further comprising storing the cryptographic affinity in an electronic database.

3. The method of claim 1, further comprising storing the cryptographic affinity in an electronic database, the electronic database electronically associating the cryptographic affinity and the blade identifier.

4. The method of claim 1, further comprising retrieving the cryptographic affinity in response to a failure of at least one of the blade server and the host bus adapter.

5. The method of claim 1, further comprising storing the cryptographic affinity in an electronic database, the electronic database electronically associating the cryptographic affinity to the blade identifier and to the host bus adapter identifier.

6. The method of claim 1, further comprising denying an access to the blade server based on the cryptographic affinity.

7. The method of claim 1, further comprising comparing the cryptographic affinity to an electronic database that stores historical values of the cryptographic affinity.

8. An apparatus, comprising:
a hardware processor; and
a memory device storing instructions, the instructions when executed causing the hardware processor to perform operations, the operations including:
receiving a read/write operation associated with a blade server installed in a chassis;
receiving a blade identifier associated with the blade server installed in the chassis;
receiving a host bus adapter identifier associated with a host bus adapter interfacing with the blade server;
generating a cryptographic affinity by hashing the blade identifier and the host bus adapter identifier using an electronic representation of a hashing algorithm;
comparing the cryptographic affinity to a historical value; and
in response to the cryptographic affinity failing to match the historical value, denying the read/write operation associated with the blade server.

9. The apparatus of claim 8, wherein the operations further comprise storing the cryptographic affinity in an electronic database.

10. The apparatus of claim 8, wherein the operations further comprise storing the cryptographic affinity in an electronic database, the electronic database electronically associating the cryptographic affinity and the blade identifier.

11. The apparatus of claim 8, wherein the operations further comprise storing the cryptographic affinity in an electronic database, the electronic database electronically associating the cryptographic affinity and the host bus adapter identifier.

12. The apparatus of claim 8, wherein the operations further comprise storing the cryptographic affinity in an electronic database, the electronic database electronically associating the cryptographic affinity to the blade identifier and to the host bus adapter identifier.

13. The apparatus of claim 8, wherein the operations further comprise receiving a request to read an electronic data stored by the blade server.

14. The apparatus of claim 13, wherein the operations further comprise denying the request to read the electronic data.

15. The apparatus of claim 8, wherein the operations further comprise receiving a request to write an electronic data to the blade server.

16. The apparatus of claim 15, wherein the operations further comprise denying the request to write the electronic data.

17. A memory device storing instructions that when executed cause a hardware processor to perform operations, the operations comprising:
receiving a read/write operation associated with a blade server installed in a chassis;
receiving a blade identifier sent from the blade server installed in the chassis;
retrieving a host bus adapter identifier associated with a host bus adapter interfacing with the blade server;
generating a cryptographic affinity by hashing the blade identifier and the host bus adapter identifier using an electronic representation of a hashing algorithm; and
if the cryptographic affinity fails to match the historical value, then denying the read/write operation associated with the blade server.

18. The memory device of claim 17, wherein the operations further comprise denying an access to the blade server.

19. The memory device of claim 17, wherein the operations further comprise denying a read operation.

20. The memory device of claim 17, wherein the operations further comprise denying a write operation.

* * * * *